(12) United States Patent
Tachinami

(10) Patent No.: US 12,013,475 B2
(45) Date of Patent: Jun. 18, 2024

(54) INFORMATION PROCESSING DEVICE, INFORMATION PROCESSING SYSTEM, PROGRAM, AND COMPUTER-READABLE RECORDING MEDIUM

(71) Applicant: SATO HOLDINGS KABUSHIKI KAISHA, Tokyo (JP)

(72) Inventor: Hideki Tachinami, Tokyo (JP)

(73) Assignee: SATO HOLDINGS KABUSHIKI KAISHA, Tokyo (JP)

( * ) Notice: Subject to any disclaimer, the term of this patent is extended or adjusted under 35 U.S.C. 154(b) by 212 days.

(21) Appl. No.: 17/780,133

(22) PCT Filed: Nov. 9, 2020

(86) PCT No.: PCT/JP2020/041690
§ 371 (c)(1),
(2) Date: May 26, 2022

(87) PCT Pub. No.: WO2021/106530
PCT Pub. Date: Jun. 3, 2021

(65) Prior Publication Data
US 2022/0413083 A1    Dec. 29, 2022

(30) Foreign Application Priority Data
Nov. 29, 2019  (JP) ................................ 2019-217533

(51) Int. Cl.
*G01S 5/02*      (2010.01)
*G06Q 30/02*     (2023.01)
*G06Q 30/0201*   (2023.01)

(52) U.S. Cl.
CPC ........ *G01S 5/0269* (2020.05); *G06Q 30/0201* (2013.01)

(58) Field of Classification Search
CPC .......................... G01S 5/0269; G06Q 30/0201
(Continued)

(56) References Cited

U.S. PATENT DOCUMENTS

| 6,108,556 A | 8/2000 | Ito |
| 2003/0083076 A1* | 5/2003 | Pradhan ................. H04W 4/02 455/456.1 |

(Continued)

FOREIGN PATENT DOCUMENTS

| JP | H10-221425 A | 8/1998 |
| JP | 2012-208676 A | 10/2012 |

(Continued)

OTHER PUBLICATIONS

Extended European Search Report issued in connection with EP Appl. Ser. No. 20894223.5 dated Nov. 21, 2022.

*Primary Examiner* — Harry K Liu
(74) *Attorney, Agent, or Firm* — Foley & Lardner LLP

(57) ABSTRACT

The present invention is an information processor including: a storage configured to store information related to an area in which a user moves around; a position calculator configured to calculate, based on a transmission signal of a communication device that moves together with the user, positions in the area of the communication device with the lapse of time; and a measuring unit configured to measure time during which each of virtual points continuously exists in a region with movement of the user, each of the virtual points being defined at a point of intersection between virtual lines that are arranged in grid in the area, the region centering at each position that is calculated by the position calculator, wherein a size of the region is set to contain at least two of the virtual points.

19 Claims, 11 Drawing Sheets

(58) Field of Classification Search
USPC .......................................................... 342/451
See application file for complete search history.

(56) References Cited

U.S. PATENT DOCUMENTS

2012/0095740 A1\* 4/2012 Kitagawa ............. G08G 1/0112
703/6
2015/0088782 A1\* 3/2015 Zhang ................ G06Q 30/0281
705/346
2016/0192140 A1   6/2016 Park et al.
2017/0127241 A1   5/2017 Sjölund et al.
2018/0060911 A1   3/2018 Deluca et al.
2019/0228337 A1   7/2019 Zhang et al.

FOREIGN PATENT DOCUMENTS

| JP | 2015-004579 A | 1/2015 | |
|---|---|---|---|
| JP | 2016-051384 A | 4/2016 | |
| JP | 2016-126002 A | 7/2016 | |
| JP | 2016-177539 A | 10/2016 | |
| WO | WO-2019053997 A1 \* | 3/2019 | ......... G02B 27/0172 |

\* cited by examiner

| CONSUMER : C001 | | |
|---|---|---|
| | TIME | POSITION |
| t0 | 2019.9.27 10:35:00 | ( 306.1 , 1028.9 ) |
| t1 | 2019.9.27 10:35:02 | ( 306.2 , 1027.8 ) |
| t2 | 2019.9.27 10:35:04 | ( 306.1 , 1027.5 ) |
| ⋮ | ⋮ | ⋮ |
| t1000 | 2019.9.27 11:08:20 | ( 2425.5 , 85.1 ) |

POSITION DATA

FIG.3

INFORMATION PROCESSING DEVICE, INFORMATION PROCESSING SYSTEM, PROGRAM, AND COMPUTER-READABLE RECORDING MEDIUM

FIELD

The present invention relates to an information processor, an information processing system, a program, and a computer-readable recording medium.

BACKGROUND

In order to understand user consumption behavior and to raise more sales in commercial facilities, such as supermarkets and shopping malls, analysis is performed on information about how consumers move around.

In one example, Japanese Unexamined Patent Application Laid-Open No. 2016-177539 discloses an information collection system for managing information of entering and leaving stores of users in time series in accordance with communication availability between mobile terminals of users and access points in respective stores. The access point is placed in each of the plurality of stores in a commercial complex, and a communication range of each access point is set to the area of the corresponding store.

BRIEF SUMMARY

Technical Problem

Unfortunately, the method disclosed in Japanese Unexamined Patent Application Laid-Open No. 2016-177539 provides only information of entering time and leaving time of a store of each consumer, from which it is difficult to understand consumer behavior in the store.

In view of this, an object of the present invention is to enable understanding consumer behavior in a store with high accuracy.

Solution to Problem

An aspect of the present invention provides an information processor including a storage, a position calculator, and a measuring unit. The storage is configured to store information related to an area in which a user moves. The position calculator is configured to calculate, based on a transmission signal of a communication device that moves together with the user, positions in the area of the communication device with the lapse of time. The measuring unit is configured to measure time during which each of virtual points continuously exists in a region with movement of the user. Each of the virtual points is defined at a point of intersection between virtual lines that are arranged in grid in the area. The region centers at each position that is calculated by the position calculator. A size of the region is set to contain at least two of the virtual points in the region.

Advantageous Effects

The one aspect of the present invention enables understanding consumer behavior in a store with high accuracy.

BRIEF DESCRIPTION OF DRAWINGS

FIG. 3 shows an example of data components of position data.

DETAILED DESCRIPTION

The present invention is related to Japanese Patent Application No. 2019-217533 filed with the Japan Patent Office on Nov. 29, 2019, the entire contents of which are incorporated into this specification by reference.

Hereinafter, a store management system 1 of an embodiment of an information processing system of the present invention will be described.

The store management system 1 of this embodiment is intended to accurately understand consumer (user) behavior in a store in which a plurality of selling sections exist alongside one another, such as a supermarket. In a store having a plurality of selling sections, a consumer is expected to move around complicatedly, compared with a store dealing with products of the same category, such as a clothing store. Thus, it is desired to understand the consumer behavior more correctly.

The store management system 1 of this embodiment acquires information showing how long and where a consumer stays in a store (information of stay times) as well as acquires a flow line showing consumer behavior of moving around in a store. Although a store area is divided into a plurality of zones per selling section, the store management system 1 of this embodiment enables correctly measuring a stay time at a boundary between adjacent zones.

The following embodiment describes a case in which a communication device that moves together with a consumer (an example of a user) is a radio tag attached to a shopping cart; however, the communication device is not limited thereto. Any communication device that moves together with a user can be used, and for example, the communication device may be a mobile terminal such as a smartphone, a tablet terminal, or a wearable terminal, of a consumer. In addition, any object that moves together with a consumer can be used as an object to which a radio tag is attached, and a shopping cart is not necessarily used. For example, a communication device (radio tag or the like) may be attached to a shopping basket.

(1) Overview of Store Management System

An overview of a store management system 1 of this embodiment will be described with reference to FIGS. 1 and 2.

Figure 1:
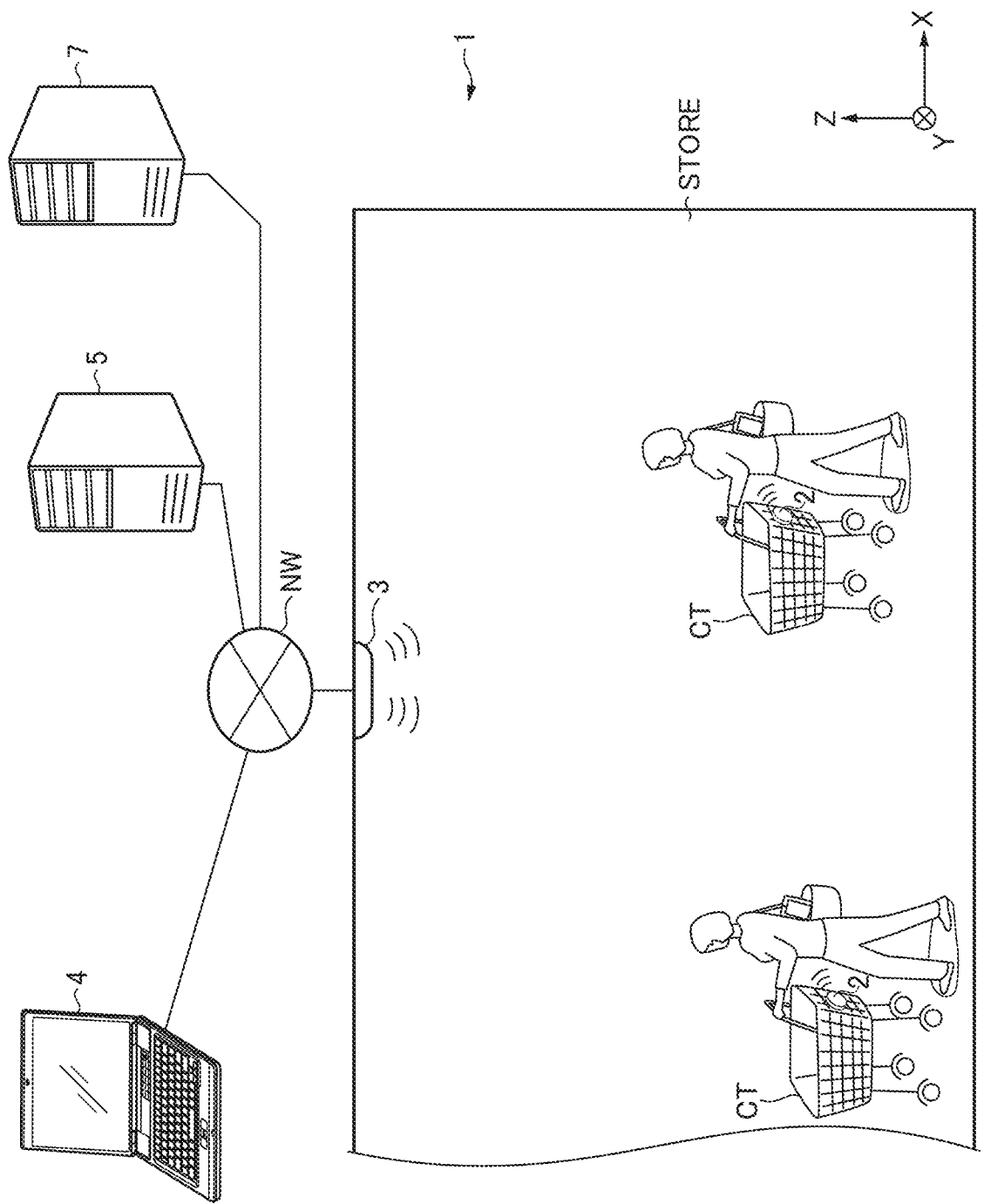
FIG. 1 schematically shows a store management system of an embodiment.

FIG. 1 schematically shows a store management system 1 of this embodiment. FIG. 2 is a plan view of an exemplary store employing the store management system 1 of this embodiment. Note that an XYZ coordinate system is defined for the purpose of showing directions in each drawing.

As shown in FIG. 1, the store management system 1 of this embodiment includes a radio tag 2 (an example of a communication device), a receiver 3, a store terminal 4, a server 5 (an example of an information processor), and a POS system 7. The radio tag 2 is attached to a cart CT that is used by each consumer in a store. Although FIG. 1 shows a case of attaching the radio tag 2 to the cart CT, the radio tag 2 may be attached to a shopping basket (not shown) on the cart CT.

As described above, the radio tag 2 is an example of a communication device and is a relatively small wireless communication device.

The receiver 3 and the server 5 are connected via a network NW, such as an intranet, and they constitute a position calculation system for calculating a position in the store of a consumer. The receiver 3 (also called a "locator") is installed on a ceiling of the store. The receiver 3 receives a radio wave that is transmitted by the radio tag 2, which is attached to a cart CT used in the store by a consumer, and it measures an incident angle of the radio wave. The server 5 identifies a position (position in terms of XY coordinates) in the store of the consumer based on the incident angle measured by the receiver 3 (that is, the server 5 measures a position of the consumer).

The communication protocol between the radio tag 2 and the receiver 3 is not specifically limited, but examples thereof include Wi-Fi (registered trademark) and Bluetooth (registered trademark) Low Energy (hereinafter abbreviated as "BLE").

The server 5 measures a position in the store of a consumer on a time basis and measures a stay time of the consumer at each virtual point (described later) in the store. The server 5 preferably creates display data for showing a flow line in the store of a consumer and more preferably creates display data for showing a flow line in consideration of the stay time (heat map, which is described later).

The store terminal 4 is placed, for example, in an office of the store, and it is a terminal having a display panel, such as a personal computer or a tablet terminal. The store terminal 4 is communicable with the server 5 via the network NW and outputs display data that is acquired from the server 5, on a display panel, to enable an employee of the store to view a flow line or a heat map of a consumer in the store.

The POS system 7 is provided so as to communicate with the store terminal 4 via the network NW and totalizes sales (sales data) per product of each of the selling sections in the store. Although the POS system 7 is provided so that an employee of the store can review sales data in relation to a flow line of a consumer, it is not necessarily included in the store management system 1 of this embodiment.

Figure 2:
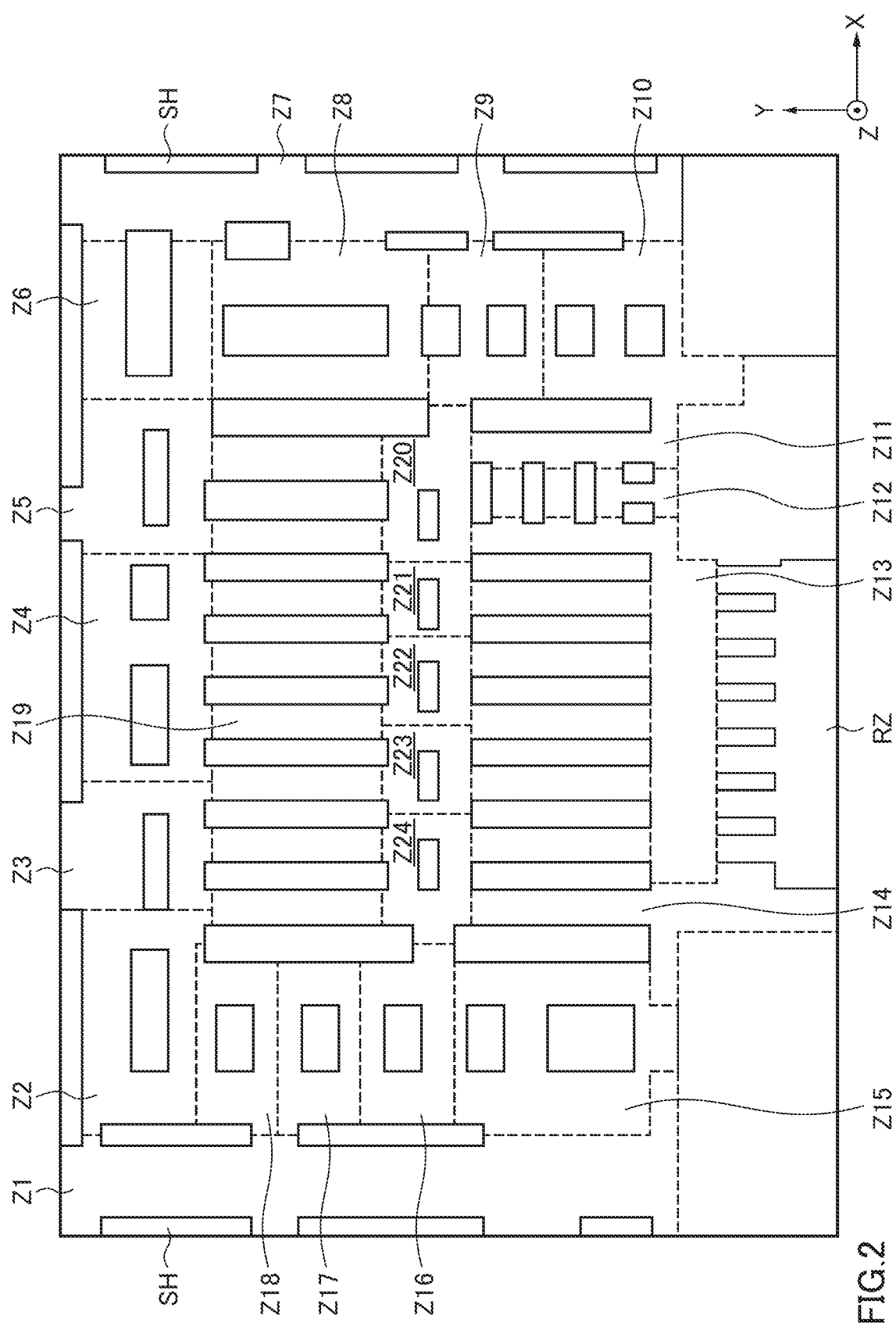
FIG. 2 is a plan view of an exemplary store employing the store management system of the embodiment.

With reference to FIG. 2, the area in the exemplary store includes a plurality of sell zones Z1 to Z24 and a checkout zone RZ, and product shelves SH for arranging products are equipped to each store. Each of the zones is assigned in accordance with categories of sales products, for example, in such a manner that they are assigned to be a meat zone, a prepared food zone, a confectionery zone, and so on.

(2) Positioning Method of Consumer and Measuring Method of Stay Time

Next, a method of positioning a consumer and a method of measuring a stay time will be described with reference to FIGS. 3 to 6.

Figure 4:
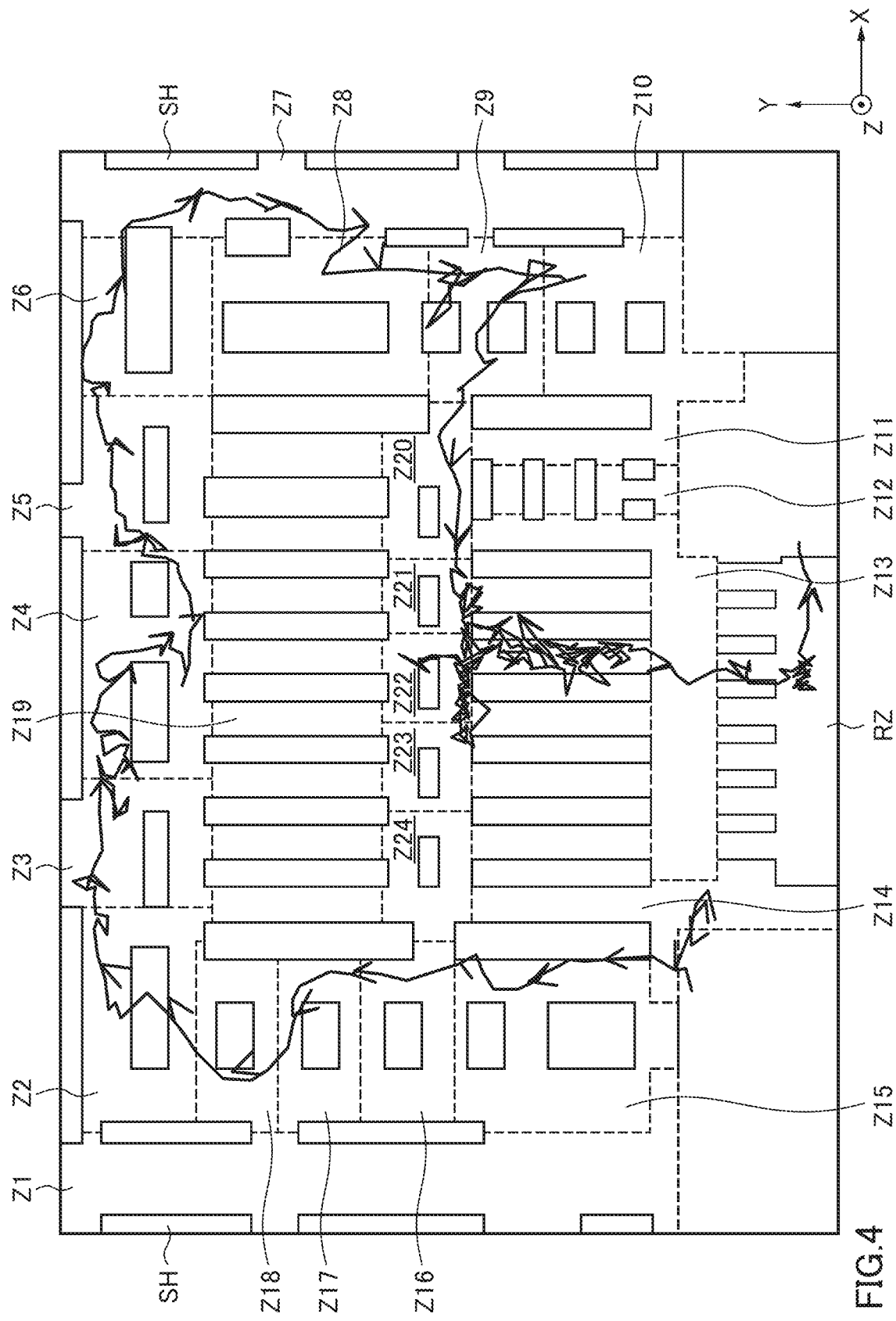
FIG. 4 shows an example of a flow line of one consumer in the plan view of FIG. 2.
Figure 5:
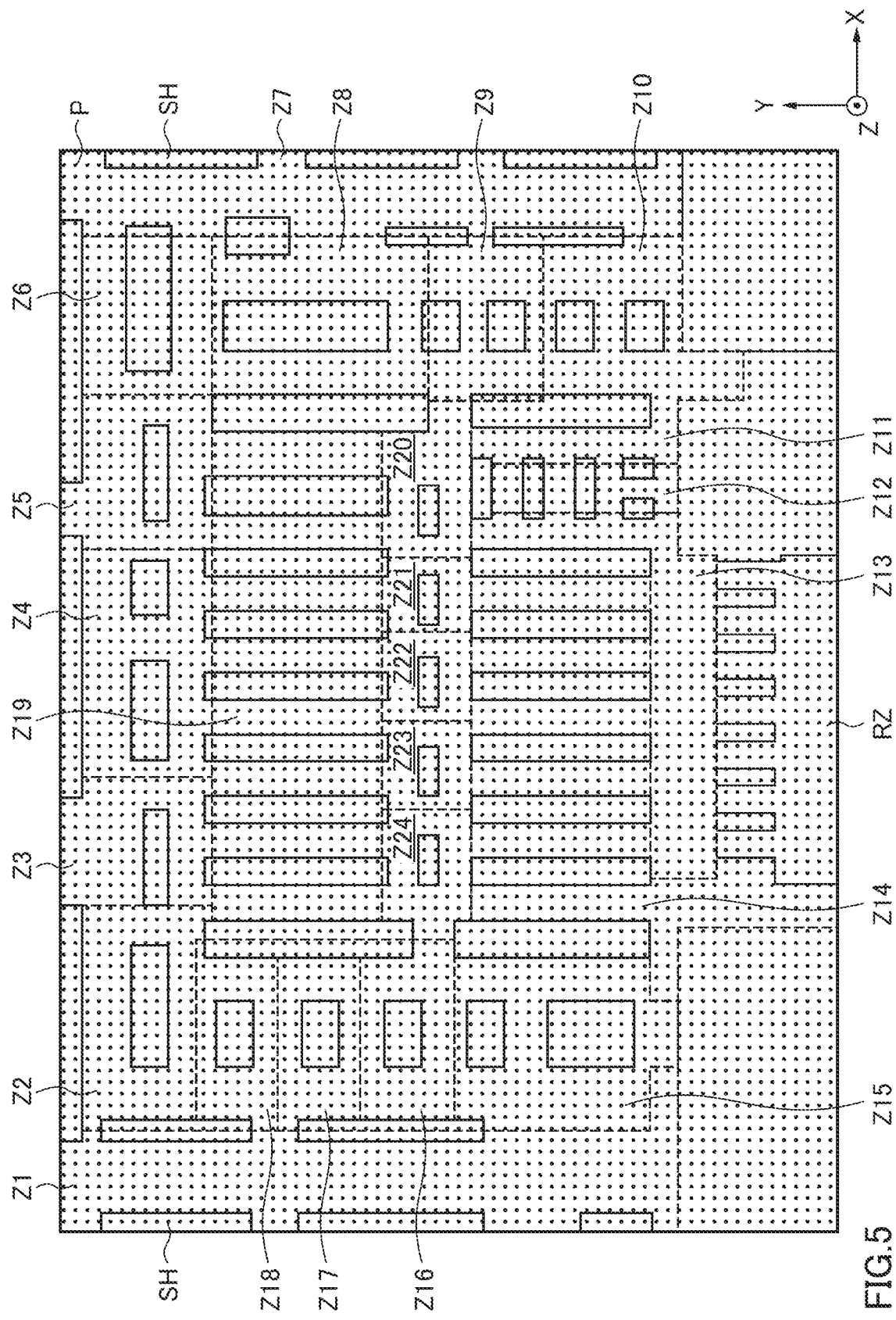
FIG. 5 shows an example of arrangement of virtual points in the plan view of FIG. 2.
Figure 6:
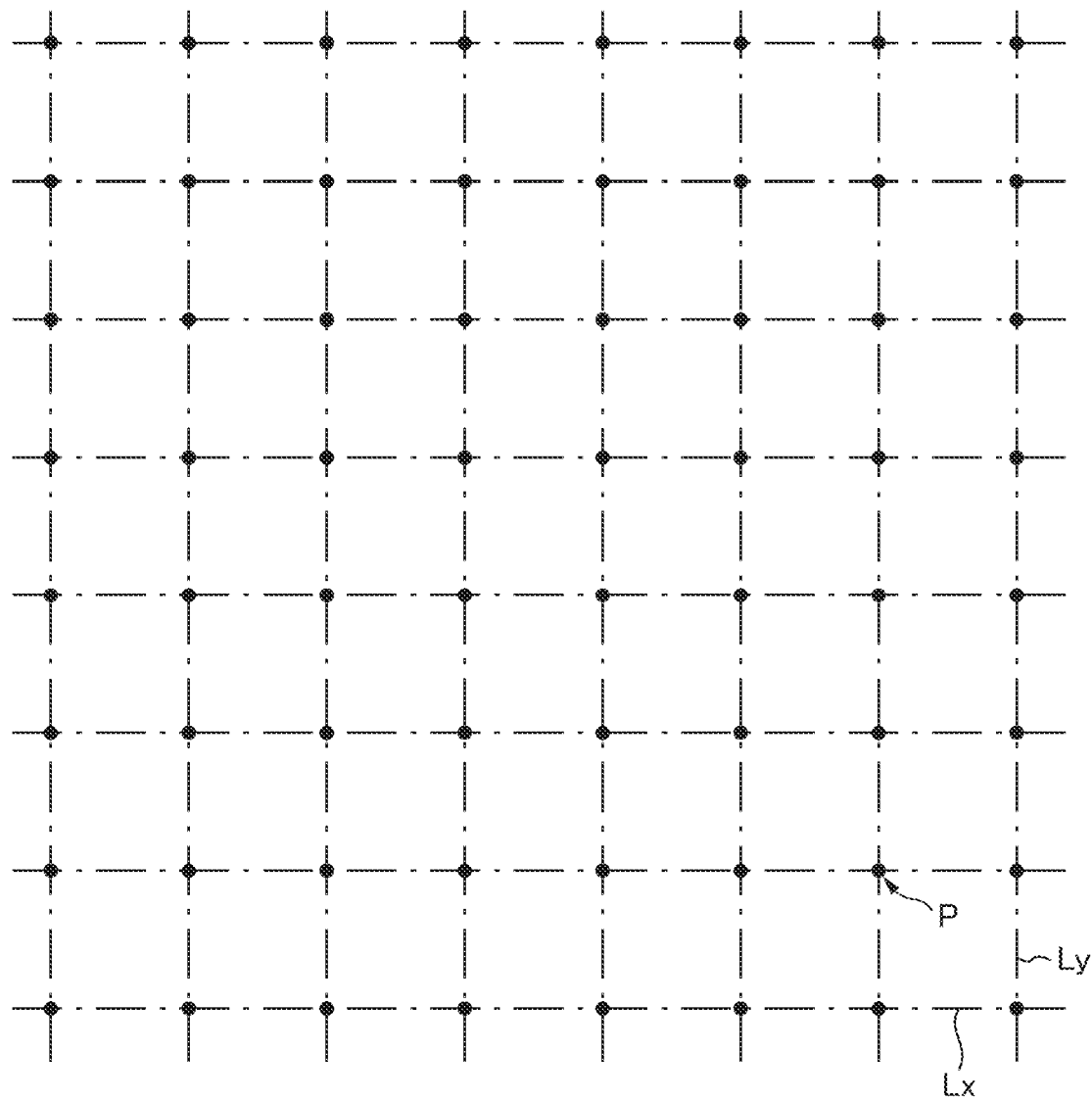
FIG. 6 shows an example of setting virtual points.

FIG. 3 shows an example of data components of position data. FIG. 4 shows an example of a flow line of one consumer in the plan view of FIG. 2. FIG. 5 shows an example of arrangement of virtual points in the plan view of FIG. 2. FIG. 6 shows an example of setting virtual points.

The radio tag 2 is positioned as described above. Specifically, the receiver 3, which is installed on a ceiling of the store, receives a radio wave (beacon signal) that is transmitted from the radio tag 2 attached to a cart being used by a consumer. The receiver 3 uses an angle-of-arrival (AOA) method for calculating an incident angle of the received beacon signal. The receiver 3 measures an incident angle (arrival direction) of the beacon signal, which is received from the radio tag 2, and it transmits information of the measured incident angle to the server 5. The server 5 estimates the position (XY coordinates) of the radio tag 2 from the position (position in terms of XYZ coordinates) in the store of the source receiver 3 and from the incident angle relative to this position.

The position of a consumer can be estimated only by one receiver 3 (locator). However, it is preferable to install more receivers 3 in accordance with the degree of a received signal strength indicator (RSSI) of a beacon signal, a store floor area, and a radio wave environment in the store. In one example, the receivers 3 are arranged on a ceiling of the store at equal intervals. The receivers 3 are preferably arranged at shorter intervals particularly at a place that requires high positioning accuracy, such as a place densely having selling sections.

The method of positioning the radio tag 2 is not limited to the AOA method, and another method, such as a time-of-arrival (TOA) method, may be used.

Although being able to be freely set, the positioning interval of a consumer is set to a time necessary to correctly understand consumer behavior (for example, 100 milliseconds to 2 seconds).

The server 5 calculates the position of a consumer and records position data per consumer.

The position data shown in FIG. 3 contains data of the position (XY coordinates) of a consumer at each positioning time. In this example, the time t0 represents the time of entering the store, whereas the time t1000 represents the time of leaving the store after passing through the checkout zone RZ. This position data that is plotted in the plan view of the store in FIG. 2 is shown in FIG. 4 as a flow line of a consumer.

In the store management system 1 of this embodiment, in order to measure the stay time in the store of a consumer, virtual points "P" are set in the area including the sell zones Z1 to Z24 in the store, as shown in FIG. 5. That is, as shown in FIG. 6 that illustrates a partially enlarged view of the area in FIG. 5, virtual points "P" are defined as points of intersection between virtual lines Lx and Ly that are arranged in grid, along an X-axis and a Y-axis in the area of the sell zones in the store. The stay time of a consumer is measured per this virtual point "P".

The distance between two adjacent virtual points "P" is freely set, but it is preferably set in accordance with positioning accuracy of the position calculation system, which is composed of the receiver 3 and the server 5. In one example, in the condition that the positioning accuracy of the position calculation system is 50 cm, the distance between two adjacent virtual points "P" may be set to 50 cm.

(3) Internal Configuration of Store Management System 1

Next, an internal configuration of the store management system 1 will be described with reference to the block diagram of FIG. 7.

Figure 7:
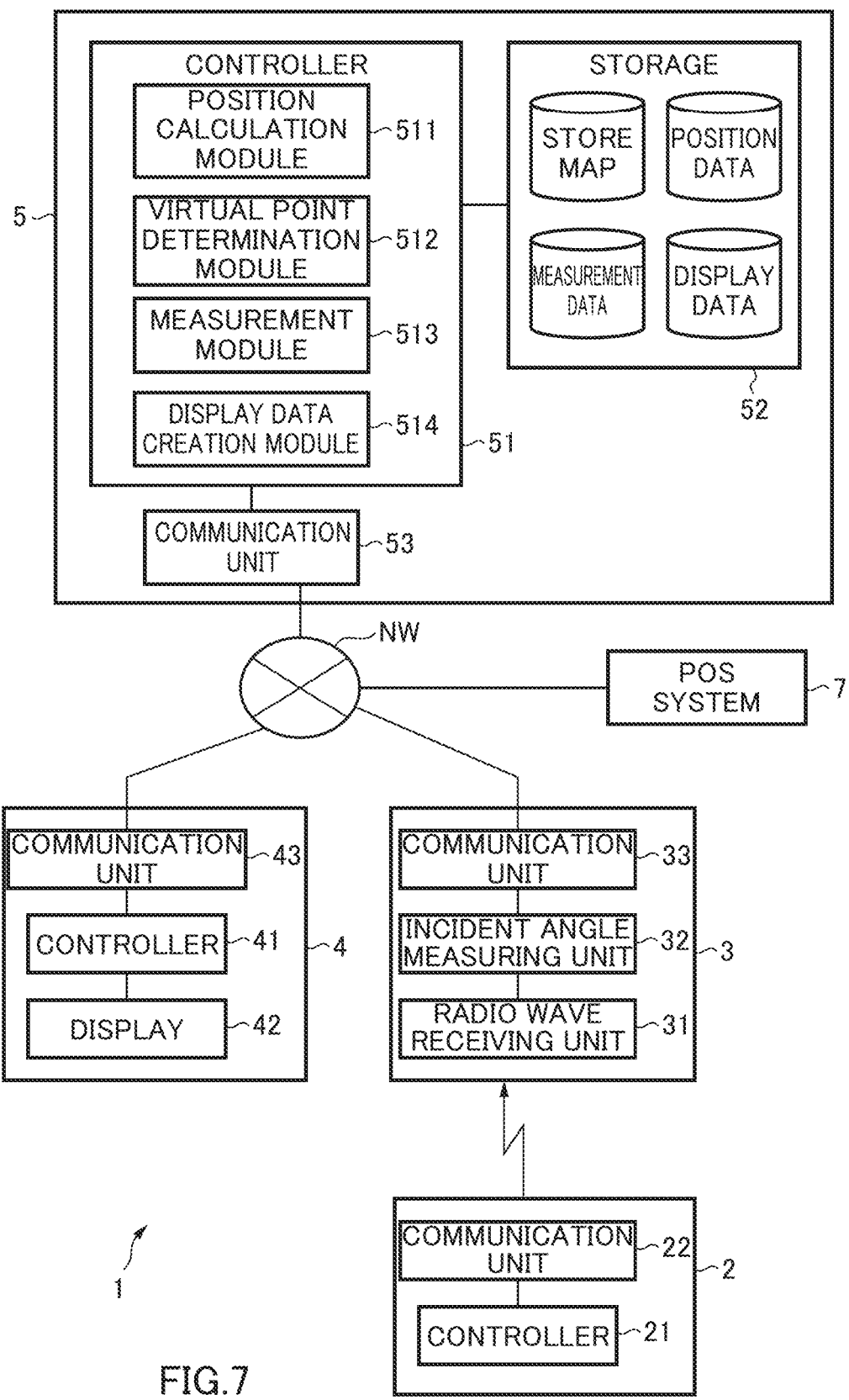
FIG. 7 is a block diagram showing an internal configuration of each device of the store management system of the embodiment.

As shown in FIG. 7, the radio tag 2 includes a controller 21 and a communication unit 22.

The controller 21 is composed mainly of a microcontroller and controls the whole radio tag 2. In one example, the controller 21 processes a reception signal and a transmission signal (processes a baseband signal).

The communication unit 22 is an interface for communicating with the receiver 3. In one example, the communication unit 22 modulates a transmission signal (e.g., a beacon signal) to the receiver 3.

As shown in FIG. 7, the receiver 3 includes a radio wave receiving unit 31, an incident angle measuring unit 32, and a communication unit 33.

The radio wave receiving unit 31 includes an antenna for receiving a beacon signal (radio wave) that is transmitted from the radio tag 2.

The incident angle measuring unit 32 measures an incident angle of a radio wave that is received from the radio tag 2 by the radio wave receiving unit 31.

The communication unit 33 is an interface for communicating with the radio tag 2 and the server 5. In one example, the communication unit 33 demodulates a reception signal from the radio tag 2. In addition, the communication unit 33 transmits information of the incident angle, which is measured by the incident angle measuring unit 32, to the server 5 via the network NW.

As shown in FIG. 7, the store terminal 4 includes a controller 41, a display 42, and a communication unit 43.

The controller 41 is composed mainly of a microcontroller and controls the whole store terminal 4.

The display 42 includes a display panel, such as a liquid crystal display (LCD) panel, and a driving circuit for driving the display panel based on display data acquired from the server 5. The display 42 displays a flow line or a heat map of a consumer in the store.

The communication unit 43 functions as a communication interface for communicating with the server 5 via the network NW. In this embodiment, the communication unit 43 receives display data from the server 5.

As shown in FIG. 7, the server 5 includes a controller 51, a storage 52 (an example of a storage), and a communication unit 53.

The controller 51 is composed mainly of a microcontroller and controls the whole server 5. In one example, the microcontroller of the controller 51 executes a predetermined program, whereby the controller 51 functions as a position calculation module 511 (an example of a position calculator), a virtual point determination module 512, a measurement module 513 (an example of a measuring unit), and a display data creation module 514.

The controller 51 is an example of a position calculator, a measuring unit, and a creation unit.

The position calculation module 511 calculates a position in the store area of the radio tag 2 in accordance with the lapse of time, based on information of the incident angle of the radio tag 2 acquired from the receiver 3, to create position data. As shown in FIG. 3, the position data shows an estimated value of the position (XY coordinates) of the radio tag 2 relative to time.

In the case of using the AOA method, the position calculation module 511 estimates the position (XY coordinates) of the radio tag 2 from a known position (position in terms of XYZ coordinates) in the store of the receiver 3 and from the incident angle relative to the known position, as described above.

The virtual point determination module 512 refers to a store map to determine a virtual point "P" being a point of intersection between virtual lines that are arranged in grid in the store area, as shown in FIGS. 5 and 6.

The store map is map data that specifies sections of the sell zones Z1 to Z24 and the checkout zone RZ and positions of the product shelves SH in the store. In the virtual point determination module 512, virtual points "P" are set based on the store map.

The measurement module 513 measures time during which a virtual point "P" continuously exists in a circular region in accordance with movement of a consumer. The measurement module 513 performs this measurement on each of virtual points "P" existing in a circular region of a virtual circle CR with a predetermined diameter centering at the position of the radio tag 2, which is calculated by the position calculation module 511.

Herein, a method of measuring the time by the measurement module 513 will be described with reference to FIG. 8.

Figure 8:
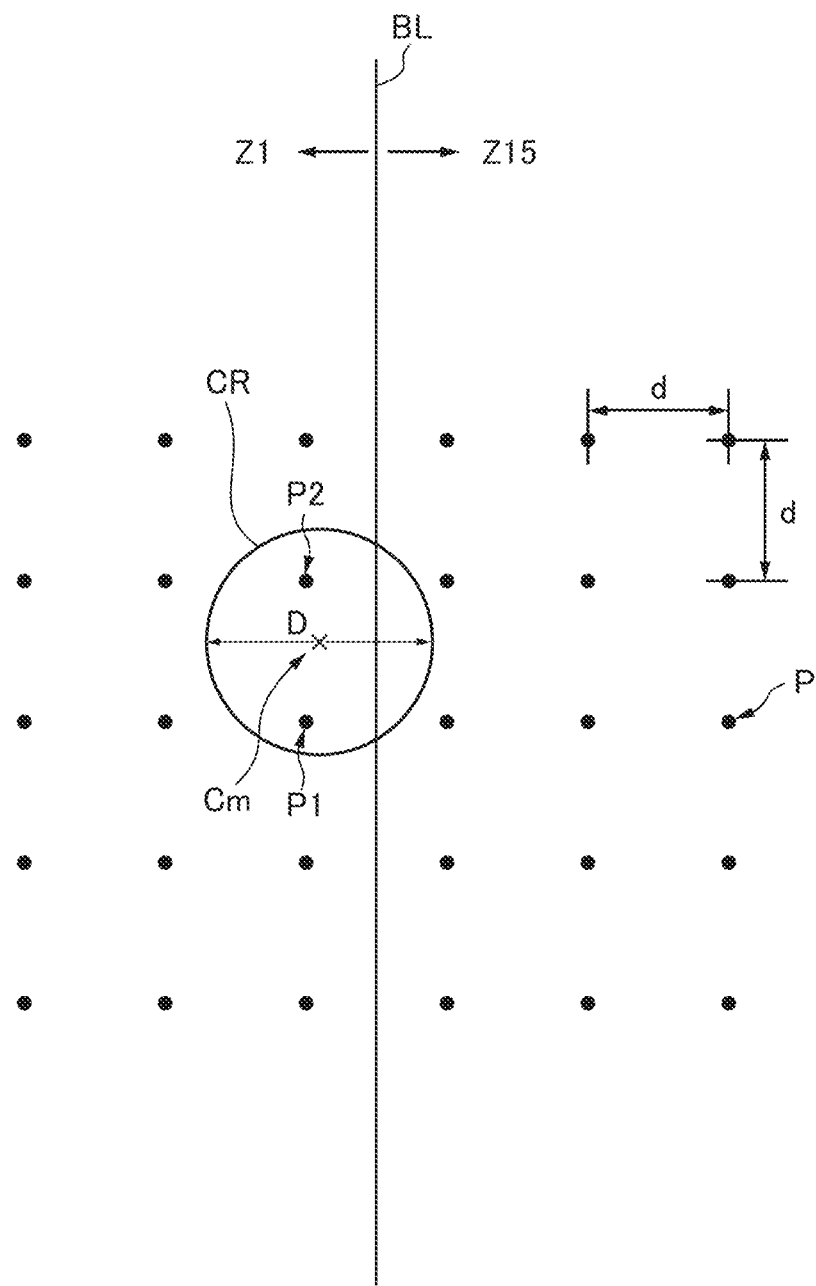
FIG. 8 shows an example of a virtual circle set in an exemplary store.

In FIG. 8, it is assumed that the position of the radio tag 2 is calculated to be a position Cm by the position calculation module 511. In this state, the measurement module 513 sets a virtual circle CR with a predetermined diameter "D" centering at the position Cm, and it identifies all virtual points within the circular region of this virtual circle CR (virtual points P1 and P2 in the example in FIG. 8). The measurement module 513 then measures the time, as a stay time, during which, for example, each of the virtual points P1 and P2 continuously exists in the circular region of the virtual circle CR due to a consumer staying in the same position.

The virtual circle CR moves together with the radio tag 2 that moves in accordance with a consumer moving around in the store, and the virtual point "P" that is contained in the circular region of the virtual circle CR set for the consumer is changed. With respect to each virtual point "P" set in the store area, a duration (that is, a stay time) of the virtual point "P" contained in the virtual circle CR corresponding to a consumer is measured. This provides information about which sell zone and which position in the sell zone the consumer stayed in the store.

Herein, the measurement module 513 may measure the stay time at each virtual point "P" in terms of integrated value (integrated time) or maximum value (maximum duration).

The integrated value of the stay time is calculated by integrating time that is measured at each virtual point "P", without resetting, from the time a consumer enters the store until the consumer leaves the store.

The maximum value of the stay time is a maximum value of duration during which a virtual point "P" exists in the circular region of the virtual circle CR, from the time a consumer enters the store until the consumer leaves the store. The duration during which a virtual point "P" exists in the circular region of the virtual circle CR is measured each time, and the duration is reset at the time the virtual point "P" once goes out of the circular region of the virtual circle CR.

The size of the virtual circle CR that is set so as to center the position of the radio tag 2 is determined based on a reference distance "d" (refer to FIG. 8) being a distance between two adjacent virtual points "P". Specifically, the diameter "D" of the virtual circle CR is set larger than the reference distance "d" being a distance between two adjacent virtual points. The reason of this is as follows.

That is, if no virtual point "P" exists in the circular region of the virtual circle CR, the stay time cannot be measured. If only one virtual point "P" is contained in the circular region of the virtual circle CR, although a consumer actually stops in a certain zone, the stay time can be measured by assuming that the consumer stays in another zone adjacent to the certain zone due to positioning error of the radio tag 2. On the other hand, in this embodiment, at least two virtual points "P" are usually contained in the circular region of the virtual circle CR, whereby the stay time is measured at each virtual point "P". This avoids mistakenly measuring the stay time at a boundary between the sell zones (e.g., a boundary BL between the sell zones Z1 and Z15 in FIG. 8).

As to a diameter "D" of the virtual circle CR being excessively greater than the reference distance "d", the stay time is measured at a virtual point "P" that is separated from the position where a consumer actually stays and deviates from the actual situation. As a result, the error in the stay time at each virtual point "P" in the area is increased.

In view of this, the diameter "D" of the virtual circle CR is preferably set so that two to five virtual points "P" will be contained in the circular region of the virtual circle CR. In one example, the diameter "D" of the virtual circle CR is preferably set so as to satisfy the relationship "d<D≤2d".

With reference to FIG. 7 again, the display data creation module 514 creates display data for displaying a flow line in the store of a consumer, based on the position data created by the position calculation module 511. This display data is created by plotting positions of the radio tag 2 of a consumer contained in the position data, in a store map, in accordance with the lapse of time (refer to FIG. 4).

In addition, the display data creation module 514 creates display data for displaying a heat map, based on the stay time (integrated value or maximum value) of each virtual point "P" in the area, which is calculated by the measurement module 513. This heat map is created in such a manner that the displayed states (e.g., shade or color) of each virtual point and its surrounding region are changed in accordance with the length of the stay time. Specifically, in terms of expression using shading, dark shading may be used for a long stay time, whereas light shading may be used for a short stay time. In another case, in terms of expression using colors, a long stay time may be expressed by a red color, whereas a short stay time may be expressed by a light blue color.

The storage 52 is, for example, a mass storage device, such as a hard disk drive (HDD), and it stores a store map, position data, measurement data, and display data. Each data in the storage 52 is appropriately updated, added, or deleted upon being accessed by the controller 51.

(4) Specific Calculation Method of Stay Time

Figure 9:
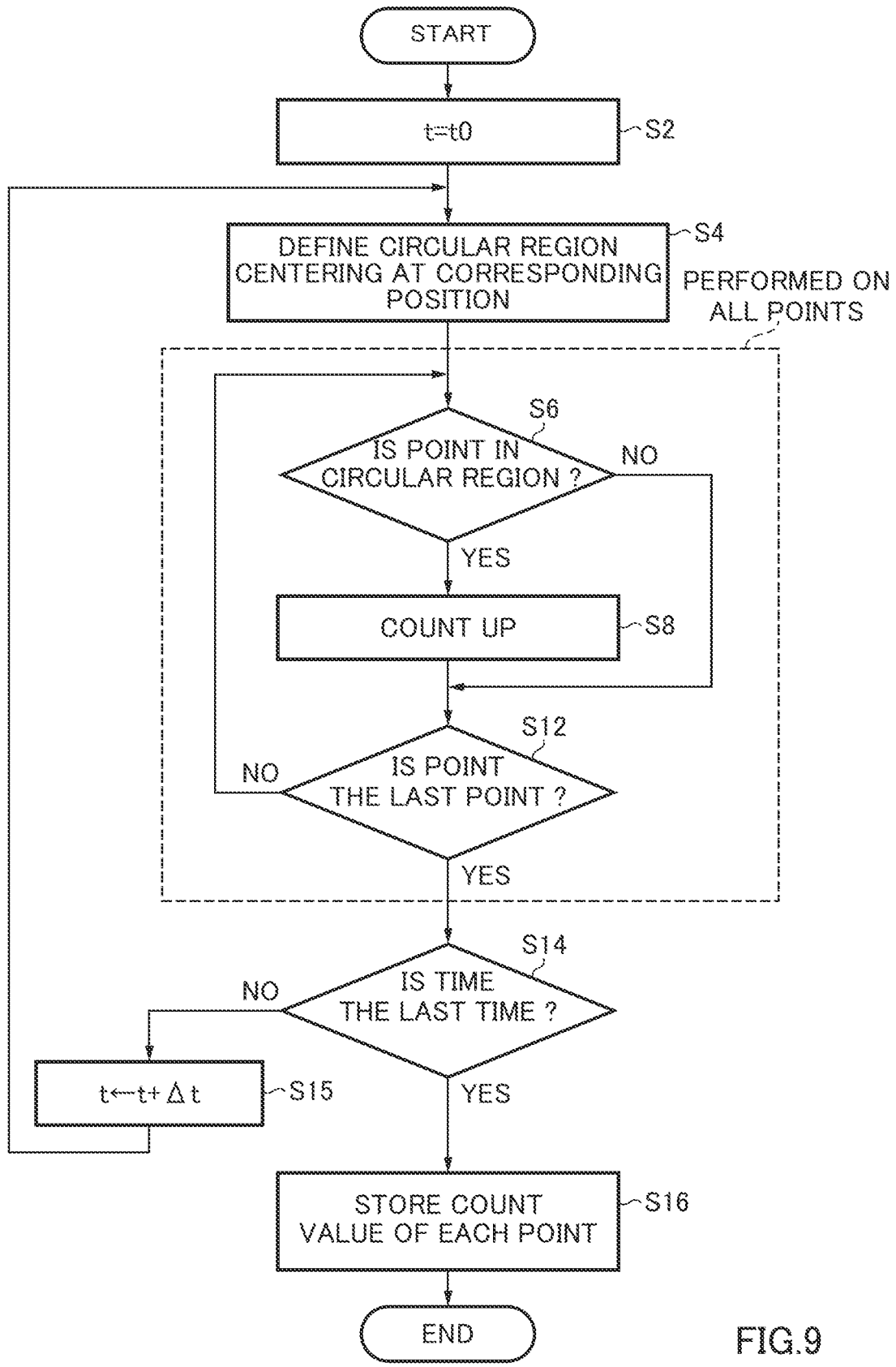
FIG. 9 is an example of a flowchart showing a method of calculating a stay time of a consumer.
Figure 10:
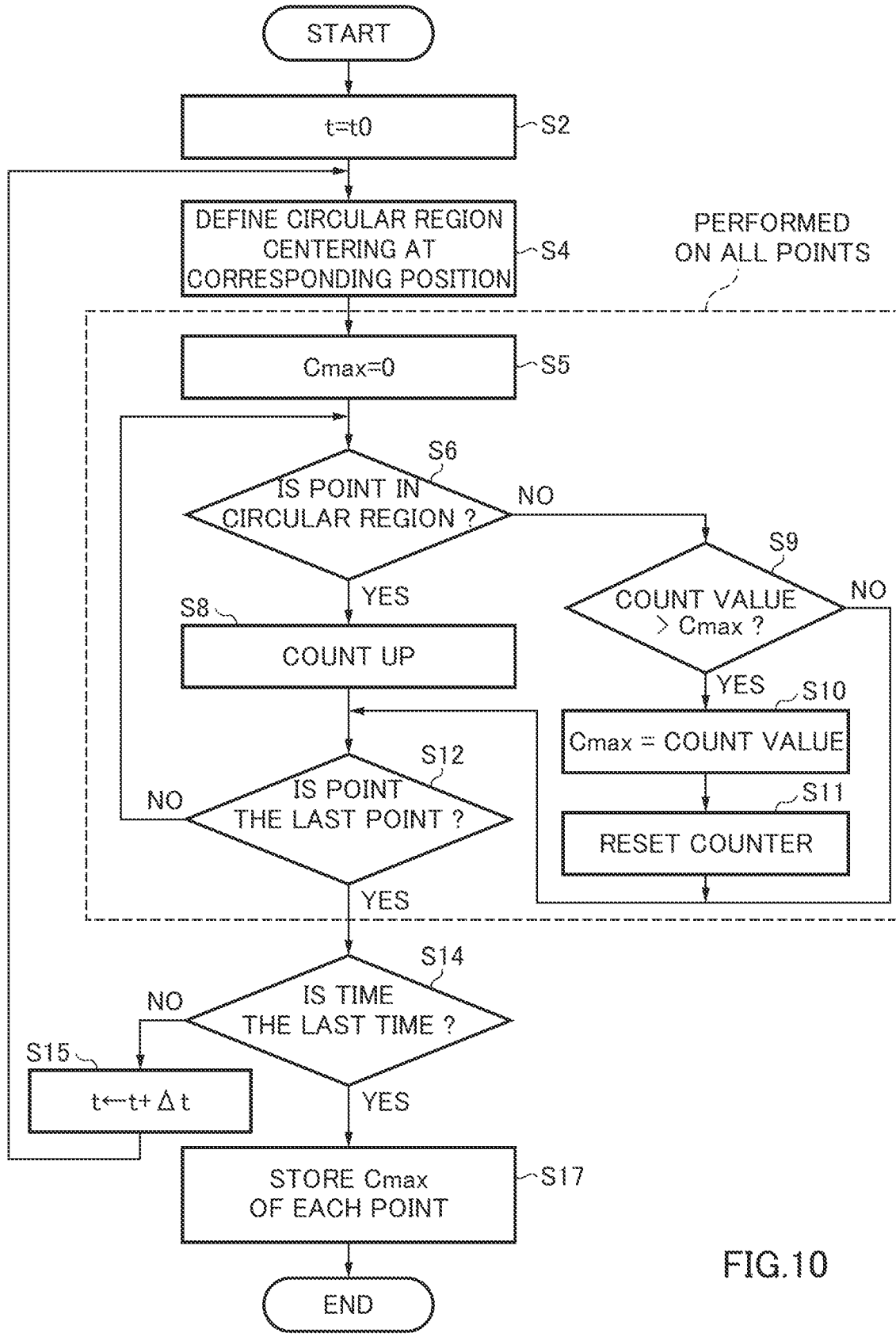
FIG. 10 is another example of the flowchart showing the method of calculating a stay time of a consumer.

Next, a specific method of calculating a stay time at a virtual point in a store area will be described with reference to FIGS. 9 and 10. FIG. 9 is an example of a flowchart showing a method of calculating a stay time of a consumer in terms of integrated value. FIG. 10 is an example of a flowchart showing a method of calculating a stay time of a consumer in terms of maximum value.

Each of the flowcharts in FIGS. 9 and 10 is executed with reference to the position data (refer to FIG. 3) by the controller 51 (measurement module 513) of the server 5.

In each of the flowcharts in FIGS. 9 and 10, an interval between successive times in the position data (FIG. 3) is assumed to be a constant interval $\Delta t$ (that is, $\Delta t$=t1−t0, t2−t1, . . . , t1000−t999).

(4-1) Calculation of Stay Time (Integrated Value) (FIG. 9)

In the flowchart shown in FIG. 9, the controller 51 sets time t (variable) to time t0 (step S2) and executes the following processes.

That is, the controller 51 defines (sets) a circular region of a virtual circle that centers at a position corresponding to the set time in the position data (step S4). The controller 51 then performs the processes in steps S6 and S8, on every virtual point in the store area. Specifically, it is determined whether a target virtual point is contained in the circular region set in step S4 (step S6), and a counter of the stay time is counted up in the case in which the target virtual point is contained in the circular region (step S8). The counter of the stay time is not counted up as to a virtual point outside the circular region.

After processing every virtual point at the time t=t0 is completed (step S12: YES), the processes in steps S4 to S12 are performed with respect to the next time, which are repeated unless the processes are performed on the last time (step S14 S15). That is, the process returns to step S4, and as to the time t=t1, the processes in steps S4 to S12 are performed in the same manner. At this time, in the case in which there is almost no change in the position of a consumer, the virtual point that is counted up with respect to the time t0 is counted up again in step S8. Note that the "last time" in step S12 means the last time that is recorded in the position data (that is, the time when the consumer leaves the store) and corresponds to t1000 in the example in FIG. 3.

In accordance with the flowchart shown in FIG. 9, the count value of the stay time at every virtual point is held. Thus, after the processes are completed with respect to every time (that is, in the example in FIG. 3, the processes are completed with respect to the time t=t1000), the count value of each virtual point is held in terms of integrated value. Thereafter, the count value of each virtual point is stored in the storage 52 (step S16). In this case, the stay time is $\Delta t \times$count value.

(4-2) Calculation of Stay Time (Maximum Value) (FIG. 10)

The processes that are the same as those in FIG. 9 are denoted by the same reference signs in FIG. 10, and redundant descriptions are omitted. The following description focuses on the difference from FIG. 9.

In the flowchart in FIG. 10, in processing each virtual point with respect to the set time t, the counter of the stay time is counted up in the same manner as in the flowchart in FIG. 9 in the case in which the virtual point is contained in the circular region of the virtual circle (step S8). On the other hand, in the case in which the virtual point is not contained in the circular region, it is determined whether the current counter value is greater than Cmax that shows the maximum value of the count value at this point of time (step S9). In the case in which the count value is greater than Cmax, this count value is used as a renewed Cmax (step S10), and the counter of the stay time is reset (step S11).

In other words, in the case in which a consumer continuously stays at almost the same position in the area, the count value of the virtual point in proximity to this position is increased; however, once the consumer leaves this position, the count value of this virtual point is reset after being compared with the past maximum value Cmax. At this time, this count value is used as a renewed Cmax if it is greater than the past maximum value Cmax, but it is neglected if it is equal to or less than the past maximum value Cmax.

In accordance with the flowchart shown in FIG. 10, the maximum value of the count value of each virtual point is held upon completion of the processes on all of the set times (that is, in the example in FIG. 3, the processes are completed with respect to the time t=t1000). Thereafter, the maximum value Cmax of the count value of each virtual point is stored in the storage 52 (step S17). In this case, the stay time is $\Delta t \times$Cmax.

Although a case of setting the interval between successive times in the position data (FIG. 3) to a constant interval is described in relation to FIGS. 9 and 10, the interval is not limited thereto. The interval between successive times contained in the position data may not be constant. In this case, the stay time is directly calculated in terms of integrated value or maximum value, instead of the count value. In one example, the process in step S8 in FIGS. 9 and 10 does not count up the counter, but it integrates time (t(n)-t(n−1)) between time t(n) to be processed and time t(n−1) that is an immediately preceding time.

Figure 11:
FIG. 11 shows an example of a heat map of one consumer in the plan view of FIG. 2.

FIG. 11 shows an example of a heat map of one consumer in the plan view of FIG. 2.

The controller 51 of the server 5 (display data creation module 514) creates display data for displaying a heat map, based on the stay time (integrated value or maximum value) at each virtual point "P" in an area, which is calculated in FIG. 9 or 10. The heat map that is shown as an example in FIG. 11 is created in such a manner that shading of each virtual point and its surrounding region is changed in accordance with the length of the stay time. That is, the heat map is displayed in such a manner that a position at which the stay time of a consumer is long is dark colored, whereas a position at which the stay time of the consumer is short is light colored.

The store terminal 4 receives the display data from the server 5 and displays the heat map. The displayed heat map is used to enable a store operator or the like to more correctly understand consumer behavior in the store.

As described above, the store management system 1 of this embodiment sets the virtual points at predetermined reference distances in an area in which a consumer moves around. In this state, the time during which the virtual point continuously exists in the circular region of the virtual circle centering at the position of the radio tag, in accordance with movement of the consumer, is measured as the stay time at each position in the area of the consumer. At this time, due to the diameter of the virtual circle set greater than the reference distance of the virtual point, it is avoided to mistakenly measure the stay time at a boundary between the sell zones set in the area.

In this embodiment, the measurement module 513 of the controller 51 of the server 5 may calculate the sum of the stay times measured with respect to all virtual points contained in each of the sell zones. This provides a stay time in each of the sell zones of the consumer and thereby makes it possible to understand consumer behavior per sell zone in the store. In this embodiment, the stay time at a boundary between the sell zones set in the area is mistakenly measured, whereby the stay time can be aggregated per sell zone, with a small measurement error.

In addition, it is useful to group a plurality of the virtual points in the area and measure the stay time (integrated value or maximum value) of each group, in analyzing consumer behavior. In this case, a plurality of the virtual points contained in one group may be set so as to belong to only one zone or may be set so as to belong to adjacent zones across a boundary.

Although an embodiment of the information processor, the information processing system, and the program is described above, the present invention should not be limited to the foregoing embodiment. In addition, the embodiment described above can be variously modified and altered within the scope not departing from the gist of the present invention.

For example, the foregoing embodiment describes an example of incorporating a positioning system for positioning the radio tag 2 (that is, the function of the position calculation module 511) into the server 5; however, the configuration is not limited thereto. The server 5 may acquire position data of the radio tag 2 from a positioning server in which the positioning system is installed, to measure the stay time of a consumer in a store based on the acquired position data.

Although the foregoing embodiment describes a case of setting a circular region of a virtual circle centering at the position of the radio tag, the shape of the region is not limited thereto. The shape of the region that is set so as to center at the position of the radio tag is not limited to a circular shape, but it may be an elliptical shape (including a substantially elliptical shape with a straight part), a square shape, or a rectangular shape. Whichever shape is set to the region that is set so as to center at the position of the radio tag, the number of the virtual points contained in this region is two or more as in the case of the above-described embodiment and is preferably five or less.

In addition, irrespective of the shape of the region set so as to center at the position of the radio tag, five virtual points that are contained in this region are preferably set so as to be arranged around the position of the radio tag. Each of the five virtual points that are arranged around the position of the radio tag is set in proximity to the position of the radio tag, resulting in an improvement in measurement accuracy of the stay time of a consumer.

The invention claimed is:

1. An information processor comprising:
a storage configured to store information related to an area in which a user moves around; and
a processor, the processor configured to:
calculate, based on a transmission signal of a communication device that moves together with the user, positions in the area of the communication device with the lapse of time; and
measure time during which each of virtual points continuously exists in a region with movement of the user, each of the virtual points being defined at a point of intersection between virtual lines that are arranged in grid in the area, the region centering at each position that is calculated,
wherein a size of the region is set to contain at least two of the virtual points.

2. The information processor according to claim 1, wherein the processor is configured to measure a maximum value of the time during which each of the virtual points continuously exists in the region.

3. The information processor according to claim 2, wherein the area includes a plurality of zones, and
the processor is configured to calculate a sum of the times that are measured on all of the virtual points contained in each of the plurality of zones.

4. The information processor according to claim 2, wherein the region is set to contain at most five of the virtual points in the region.

5. The information processor according to claim 2, wherein the region is a circular region, and the circular region has a diameter that is set so as to be larger than a distance between adjacent two of the virtual points.

6. The information processor according to claim 1, wherein the processor is configured to measure an integrated value of the time during which each of the virtual points continuously exists in the region.

7. The information processor according to claim 6 wherein the area includes a plurality of zones, and
the processor is configured to calculate a sum of the times that are measured on all of the virtual points contained in each of the plurality of zones.

8. The information processor according to claim 6, wherein the region is set to contain at most five of the virtual points in the region.

9. The information processor according to claim 6, wherein the region is a circular region, and the circular region has a diameter that is set so as to be larger than a distance between adjacent two of the virtual points.

10. The information processor according to claim 6, wherein the processor further configured to create display data for displaying the area in such a manner that each of the virtual points is displayed differently depending on the length of the measured time.

11. The information processor according to claim 1, wherein the area includes a plurality of zones, and
the processor is configured to calculate a sum of the times that are measured on all of the virtual points contained in each of the plurality of zones.

12. The information processor according to claim 1, wherein the region is set to contain at most five of the virtual points in the region.

13. The information processor according to claim 12, wherein the five virtual points are set so as to be arranged around the position that is calculated by the position calculator.

14. The information processor according to claim 11, wherein the region is set to contain at most five of the virtual points in the region.

15. The information processor according to claim 2, wherein the processor further configured to create display data for displaying the area in such a manner that each of the virtual points is displayed differently depending on the length of the measured time.

16. The information processor according to claim 1, wherein the region is a circular region, and the circular region has a diameter that is set so as to be larger than a distance between adjacent two of the virtual points.

17. The information processor according to claim 1, wherein the processor further configured to create display data for displaying the area in such a manner that each of the virtual points is displayed differently depending on the length of the measured time.

18. An information processing system comprising:
a communication device configured to move together with the user;
a receiver configured to be placed in an area in which the user moves around and to receive a signal from the communication device; and
a server configured to communicate with the receiver,
the information processor comprising:
a storage configured to store information related to the area;
a position calculator configured to calculate, based on a reception signal from the receiver, positions in the area of the communication device with the lapse of time; and
a measuring unit configured to measure time during which each of virtual points continuously exists in a region with movement of the user, each of the virtual points being defined at a point of intersection between virtual lines that are arranged in grid in the area, the region centering at each position that is calculated by the position calculator,
wherein a size of the region is set to contain at least two of the virtual points.

19. A computer-readable recording medium recording a program, the program configured to make a computer access a storage and execute a predetermined method, the storage storing information related to an area in which a user moves around,
the method comprising:
calculating, based on a transmission signal of a communication device that moves together with the user, positions in the area of the communication device with the lapse of time; and
measuring time during which each of virtual points continuously exists in a region with movement of the user, each of the virtual points being defined at a point of intersection between virtual lines that are arranged in grid in the area, the region centering at each calculated position,
wherein a size of the region is set to contain at least two of the virtual points.

* * * * *